Figure 1:

May 31, 1938. B. GASPAR 2,119,323
METHOD OF PRODUCING MULTICOLOR PHOTOGRAPHIC PICTURES AND MATERIAL THEREFOR
Filed Jan. 7, 1936 2 Sheets-Sheet 1

INVENTOR
Bela Gaspar
BY
F. Gerald Toye
ATTORNEY

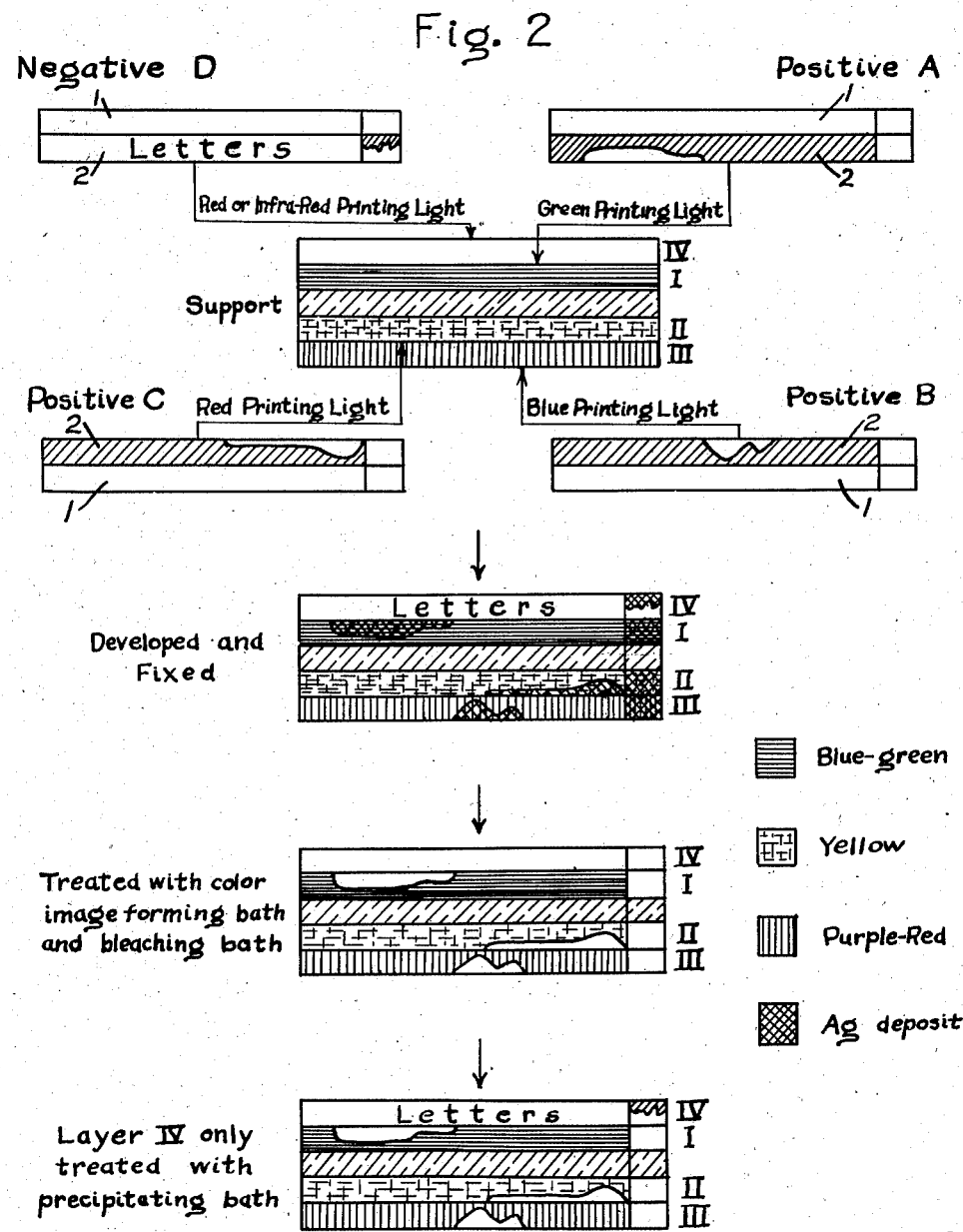

Patented May 31, 1938

2,119,323

UNITED STATES PATENT OFFICE 2,119,323

METHOD OF PRODUCING MULTICOLOR PHOTOGRAPHIC PICTURES AND MATERIAL THEREFOR

Bela Gaspar, Brussels, Belgium

Application January 7, 1936, Serial No. 57,905 In Germany January 5, 1935

9 Claims. (Cl. 95—2)

The invention relates to a process for producing multi-color photographic pictures, cinematograph films and sound films in which the colored pictures are combined with a silver image or its transformation products. The silver image, preferably a black and white image or alternatively in the form of another colored toned picture, is disposed on the surface of the united layers. It is already known to produce combined pictures which are partly colored and partly consist of a metal picture image. For instance, the quantity of silver initially produced in the image may have been such that a portion serves for the production of a colored picture and the excess for the production of a black image. This process, however, has the disadvantage that the colored picture and the silver picture are identical to each other and the degree of coloring and the density of the remaining silver image stand necessarily in inverse relation to each other.

The process of the present invention is free from these disadvantages and furthermore possesses the advantage that it can also be used to produce black or dark images in any particular layer of a multilayer material. For color photographic purposes, this makes it possible, for instance, to combine a colored picture with a black or dark picture which is not identical with the uppermost colored partial picture. This dark additional picture may be a part image in which light rays arbitrarily chosen within more or less narrow limits are registered, or is alternatively quite independent of the subject of the partial pictures present in the colored layers.

The method consists in that the picture images produced, in a manner known per se, in different layers or strata of a single or multilayer material, are first of all developed and bleached altogether. The colored partial pictures are produced before or after this step. Of the silver salt formed by the bleaching process, the silver salt lying on the surface only is, in accordance with this invention, transformed, by reduction, into metallic silver or into a dark metallic salt. If required, the deep penetration of the blackening is prevented by an interruption bath.

The invention is adapted to the production of negative, as well as positive, pictures and cinematograph films. The method is particularly advantageous for producing sound films and combined pictures in which dyestuff pictures and black and white silver pictures are combined with one another, as, for example, a three-colored picture with a black and white silver deposit picture, in which the deep shadows and also the sound record are formed by a black and white silver picture.

The method according to this invention also makes it possible to produce in ordinary single layer material pictures which, in addition to a colored picture, also contain a black and white picture. For this purpose, a film colored with a filter dyestuff is printed from two sides so that picture images are produced on both surfaces of the layer and the silver pictures are developed. Use is made for this purpose of either very quickly acting re-agents, the effect of which can be stopped at once by a substance of chemically opposite reaction or, alternatively, of slow acting chemical compounds, such, for instance, as alkaline photographic developers which act first on the surface and the effect of which in the deeper layers can be prevented by suitable baths, for instance, acid baths. As the use of such interruption baths in color photographic processes is already known, their application in carrying out the present invention presents no practical difficulties.

Combinations of multicolored pictures with black and white pictures can be produced with particular advantage in this way. It is also possible, in the case of cinematograph films, to produce the sound record as a purely black and white silver picture.

Specific examples of the present invention are illustrated in the accompanying drawings, in which Figure 1 illustrates diagrammatically the coloring and sensitization of the individual layers of a multilayer material. On the entire cross section of the material is projected a spectrum having vertical lines denoting the wave lengths. The shaded curves in each layer indicate the absorption of the dye in the layer. The $(x)$s indicate the sensitivity and the $(*)$s indicate optional sensitivity in the infra-red range for layer IV.

Figure 2 illustrates the various steps in the production of the finished picture from the material of Fig. 1.

Figure 3:
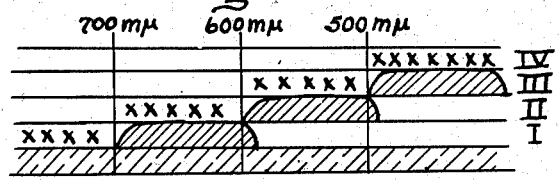
Figure 4:
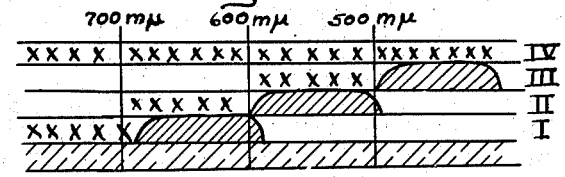
Figure 5:
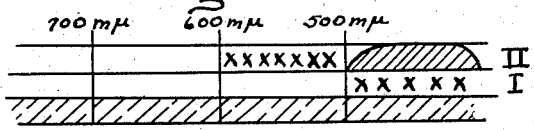

Figure 3 is a diagrammatic illustration similar to Fig. 1 representing a modified application of my invention. Figure 4 is a diagrammatic illustration similar to Fig. 1 representing a further modified application of my invention. Figure 5 is a diagrammatic illustration similar to Fig. 1 representing a material adapted to be used as a constituent of a bi-pack material.

Example 1

Referring now more particularly to Figure 1 of the drawings, I use a light sensitive multilayer material having four silver halide layers I, II, III and IV, layers I, II and III being colored blue green, yellow and purple respectively and layer IV being colorless. The respective dyestuffs may be, for example, Diamine pure blue (Schultz, Farbstofftabellen VII Ed., No. 510), Chrysophenin G (Schultz, I. C. No. 726) and Diamine fast pink G (Ullmann, Encyclopädie der Technischen Chemie, II Ed., vol. 3, page 647).

Layer I is predominantly sensitized for green and coated on to the support.

Layer II is predominantly sensitized for red and is coated on to the other side of the support.

Layer III is an ordinary silver halide emulsion and is coated on top of layer II.

Layer IV is predominantly sensitized for red or for infra-red and is coated on top of layer I thus making a multilayer film having two layers on either side of the support. It will be understood both layers I and IV may also have their natural blue sensitivity although Fig. 1 illustrates only the predominant sensitivity.

Alternatively layer IV may be an ordinary blue sensitive silver halide emulsion but, in such a case, layer I should contain a yellow filter dye such, for example, as tartrazine.

With such a material I may produce a combined color film as shown in Fig. 2 having a black picture in the top layer IV and three colored part images in the other three layers. Assuming that the black image is to be a sound record and a translation of the spoken words in black letters, I use three positive master images, or color separation images each of which is a record of one of the three primary colors of the multicolor image and I further use a negative master image containing in the sound area a negative sound record and in the picture area transparent letters on a black background.

I now print the master positive A, comprising a support 1 and emulsion 2 including an image corresponding to the red sensations of the original, by green printing light optically or in contact with the colorless layer IV, thereby producing a latent negative in the layer I (see Figure 2). I further print the blue and green master positives C and B from the other side of the material into layers II and III using red and blue printing light respectively. The master negative D containing the sound record and the letters is printed with red printing light into layer IV optically or in contact with this layer.

The film containing latent negatives in the three-colored layers and a latent positive in the colorless layer is now developed and fixed. After developing or fixing or both it is immersed in a solution containing:—5% thiocarbamide and 2% citric acid, for about ten minutes and then washed.

The dyestuff is by this treatment destroyed at the points where the silver is present but the silver is still left in the layer. If it were not fixed before this treatment the film is now fixed with an ordinary fixing solution.

It is then treated with a solution containing 3% cupric chloride and 0.5% nitric acid for a sufficient length of time to convert all the silver into silver chloride.

The next step consists in treating the entire film with a 0.5% sodium hydrosulphide solution until the black sound record and the black letters become distinctly visible but not much longer. The film is then immersed in a bath of water to wash out the hydrosulphite. Now the various colored layers still contain the silver chloride whereas the colorless layer contains a black positive sound record and black letters. The film is now fixed in the known manner with sodium thiosulphate (hypo).

*Example 2*

On a material consisting of several colored layers which contain dyestuffs or dyestuff-forming substances, as described in my British Patent No. 408,991 (U. S. Patent No. 1,985,344, patented Dec. 24, 1934), a separate uncolored silver bromide layer or a silver bromide layer containing no dyestuff-forming substance may be poured. Materials such as illustrated in my British Patents No. 415,040 (U. S. application S. N. 642,960, filed Nov. 16, 1932), No. 416,566 (U. S. Patent No. 2,071,688 of Feb. 23, 1937), and No. 416,660 are susceptible of the same treatment.

(a) As shown in Fig. 3 this additional silver halide layer may be sensitive in respect to a spectral range for which the other partial layers are not sensitized. A text to accompany the projected film or, alternatively, any black and white key print can be copied into this silver halide layer, for instance, by using a separate master image. By printing such a master image with blue light from the side of the material carrying the additional silver halide layer IV, optically or in contact as heretofore indicated, none of the other layers will be affected. This is due to the absorption of the yellow dyestuff in layer III which prevents the blue printing light from affecting any subsequent layers. Thus the image printed in layer IV may be quite independent of the other images printed in layers I, II and III, respectively.

(b) As shown in Fig. 4 the additional silver halide layer may be made panchromatic and therefore yields a black and white key print which combines in itself all the partial pictures and is produced by the acts of exposure of the various partial layers I, II and III.

(c) As shown previously in Fig. 1 the added silver layer may alternatively be sensitized to infra-red.

The individual partial pictures of the multicolor picture are copied in the corresponding partial layers in the known way from positive partial master images and a negative key print master image which, for instance, only contains the deep shadows of the picture and a negative of the sound record, is copied in the colorless layer to give a black and white additional picture and a black and white sound record. After development and fixing the pictures are treated for instance in an acid thiocarbamide solution in which the dyestuff is destroyed proportionally to the silver, and after this the metallic silver deposit in all of the layers is converted into silver bromide by treatment with a solution of cupric bromide. The silver halide present in the colorless layer is blackened by a developing solution, for example, the usual alkaline developer, then the film is treated in an interruption bath of diluted acetic acid and then fixed, whereby the silver halide is released from the colored layers. A so-called four-color picture, i. e., a three-colored picture and an additional black and white silver picture and a black and white sound record are obtained.

*Example 3*

Using the material of Fig. 3, for example, a pure black sound record is produced by diffusely exposing the portions of the colored layers covering the sound track with a colored light for which the colorless layer is not sensitive. The dyestuff is then diffusely destroyed, in the colored layers, by one of the means indicated in my British Patents Nos. 397,159 (U. S. Patent No. 2,020,775 of Nov. 12, 1935) and 397,192. The result is a black sound picture which lies in the colorless layer.

For certain purposes it is also advantageous to omit altogether any picture copying in the colorless layer and to use the colorless layer solely for producing the sound record.

*Example 4*

A two layer material as shown in Fig. 5, the lower layer I of which is sensitive to blue, and the upper layer II of which is sensitive to green (a yellow filter dyestuff may also be present), is disposed in the camera, celluloid side towards the objective, and exposed as a constituent of a bipack, as the case may be, the back part of which, which is not essential for this process, consists of a red sensitive film. After development and fixing ordinary black and white pictures are obtained. The double layer film is transformed with cupric chloride or cupric bromide into silver chloride or silver bromide. After washing, the silver halide of the upper layer II is reduced to black silver by a developer or by a sodium hydrosulphite solution. As developer use is made of:—

(a) A strong alkaline developer in high concentration containing for instance hydroquinone and caustic soda. The silver is at once blackened on the surface and the penetration of the developer into the depths of the layer is at once stopped by immersion in a 2% hydrochloric acid solution.

(b) It is still preferable first to use a solution of sodium hydrosulphite, the action of which is rendered ineffective after a few seconds by some oxidizing agent, as, for instance, a diluted solution of potassium permanganate.

(c) The quantity, as well as the period of action of the blackening agent, can be very precisely measured if the re-agents mixed with a thickening medium, as, for instance, dextrine or starch, are applied by means of a suitable device such as a roller or a device acting by capillary action like a sponge or a wadding swab. After having been treated in this way the film or photographic material is introduced into an interruption bath whereby action on the deeper layers is prevented.

By this treatment a photographic picture is obtained which contains on the surface in layer II, a metallic silver image and on the inside an image consisting of copper and silver halide. The deeper picture in layer I may for instance be colored with a basic dyestuff or be converted into another combination like copper thiocyanate and this is then colored with a basic dyestuff. The superficial metallic silver image is either left as such or is converted into a toned product of the silver or into a dyestuff picture.

The superficial picture may, for instance, be converted into an iron-blue picture or, in the known way, after immersion in a solution of leuco-ester be transformed into a dyestuff picture. Then so-called intermediate positives can be obtained from the partial negatives in the usual way by means of filters, which intermediate positives may be used as master images for producing colored pictures in the material indicated for instance in my British Patents Nos. 408,991 (U. S. Patent No. 1,985,344 of Dec. 24, 1934), 415,040 (U. S. application S. N. 642,960 filed Nov. 16, 1932) and 416,566 (U. S. Patent No. 2,071,688 of Feb. 23, 1937).

I claim:—

1. The method of producing colored photographic and kinematographic pictures having a colored image combined with a dark silver image in a light sensitive silver halide material containing a coloring substance in the inner strata thereof which comprises, printing into the inner strata of said material an image corresponding to the image to be colored, printing into the outer strata of said material an image corresponding to the image to be dark, developing the latent silver images to form silver images, producing a colored image from said coloring substance, in the inner strata corresponding to the silver image therein without entirely destroying the silver in said inner strata, treating said material with a bleaching agent to convert said silver images into insoluble silver salts capable of being removed by a fixing agent, treating the outer strata only of said material with a reagent which converts said insoluble silver salts into an insoluble precipitate which absorbs sufficient light rays throughout the visible spectrum to give a substantially grey to black appearance and fixing out the remaining silver salts from said inner strata.

2. The method of producing colored photographic and kinematographic pictures having a colored image combined with a dark silver image in a light sensitive silver halide material containing a coloring substance in the inner strata thereof, which comprises, printing into the inner strata of said material an image corresponding to the image to be colored, printing into the outer strata of said material an image corresponding to the image to be dark, developing the latent silver images to form silver images, producing a colored image from said coloring substance in the inner strata corresponding to the silver image therein without entirely destroying the silver in said inner strata, treating said material with a bleaching agent to convert said silver images into insoluble silver salts capable of being removed by a fixing agent, treating the outer strata only of said material with a reducing agent which converts said insoluble silver salts into metallic silver and fixing out the remaining silver salts from said inner strata.

3. The method of producing colored photographic and kinematographic pictures having a colored image combined with a dark silver image in a light sensitive silver halide material containing a coloring substance in the inner strata thereof, which comprises, printing into the inner strata of said material an image corresponding to the image to be colored, printing into the outer strata of said material an image corresponding to the image to be dark, developing the latent silver images to form silver images, producing a colored image from said coloring substance in the inner strata corresponding to the silver image therein without entirely destroying the silver images in said inner strata, treating said material with a bleaching agent to convert said silver images into insoluble silver salts, treating the outer stratum of said material with a powerful reducing agent, stopping the action of said reducing agent by an interruption bath before it reaches said inner strata and fixing out the remaining silver salts from said inner strata.

4. The method of producing colored photographic and kinematographic pictures having a colored image combined with a dark silver image in a light sensitive silver halide material containing a coloring substance in the inner strata thereof, which comprises, printing into the inner strata of said material an image corresponding to the image to be colored, printing into the outer strata of said material an image corresponding to the image to be dark, developing the latent silver images to form silver images, producing a colored image from said coloring substance in the inner strata corresponding to the silver image therein without entirely destroying the silver in said inner strata, treating said material with a bleaching agent to convert said silver images into insoluble silver salts, treating the surface of said material with an absorbent material soaked with a reagent which converts said insoluble silver salts into an insoluble precipitate which absorbs sufficient light rays throughout the visible spectrum to give a substantially grey to black appearance and fixing out the remaining silver salts from said inner strata.

5. The method of producing colored photographic and kinematographic pictures having a multicolored image combined with a dark silver image in a photographic material comprising a plurality of differently sensitized and differently colored light sensitive silver halide strata and an outer uncolored light sensitive silver halide stratum the coloring substances being ones which may be destroyed by reaction with a silver image which comprises, selectively printing positive part images into the color containing strata, printing a negative image of the image to be dark into the uncolored stratum, developing the latent silver images to form silver images, destroying the color at the points of the silver image in the color containing strata without entirely destroying said silver images, treating the material with a bleaching agent to convert said silver images into insoluble silver salts capable of being removed by a fixing agent, and then treating the outer stratum only with a reagent which converts said insoluble silver salts into an insoluble precipitate which absorbs sufficient light rays throughout the visible spectrum to give a substantially grey to black appearance and fixing out the remaining silver salts from the other strata.

6. The method of producing colored photographic and kinematographic pictures having a multicolored image combined with a dark silver image in a photographic material comprising a plurality of differently sensitized light sensitive silver halide strata each containing a different dyestuff-forming substance, and an outer colorless light sensitive silver halide stratum containing no dyestuff forming substance, which comprises, selectively printing positive part images into the strata containing dyestuff forming substances, printing a negative image of the image to be dark into the outer stratum, developing the latent silver images to form silver images, converting said dyestuff forming substances into dyestuff images at the points free of silver without entirely destroying the silver in these strata, treating the material with a bleaching agent to convert said silver images into insoluble silver salts capable of being removed by a fixing agent, and then treating the outer stratum only with a reagent which converts said insoluble silver salts into an insoluble precipitate which absorbs sufficient light rays throughout the visible spectrum to give a substantially grey to black appearance and fixing out the remaining silver salts from the other strata.

7. A photographic material comprising a support, three differently sensitized light sensitive silver halide strata for registering all of the different part images of a multicolor image, each of said strata being colored with a different dyestuff adapted to be destroyed locally under the influence of a silver image and a supplementary uncolored silver halide stratum, predominantly sensitized for a spectral range for which none of said dyed strata are sensitive.

8. A photographic material comprising a support, three differently sensitized light sensitive silver halide strata for registering all of the different part images of a multicolor image, each of said strata being colored with a different dyestuff adapted to be destroyed locally under the influence of a silver image and a supplementary uncolored silver halide stratum, predominantly sensitized for a spectral range the same as that for which one of the colored strata other than the immediately juxtaposed stratum is predominantly sensitized and an additional filter dyestuff in a stratum intermediate the two similarly sensitized strata, said filter dyestuff being adapted to absorb light for which said supplementary stratum is predominantly sensitized.

9. A photographic material comprising a support, three differently sensitized light sensitive silver halide strata for registering all of the different part images of a multicolored image, each of said strata being colored with a different dyestuff adapted to be destroyed locally under the influence of a silver image to form a corresponding color image and a supplementary uncolored silver halide strata sensitized panchromatically so as to include a spectral range for which the immediately juxtaposed layer is insensitive.

BELA GASPAR.